US009312742B2

(12) United States Patent
Grosskopf et al.

(10) Patent No.: US 9,312,742 B2
(45) Date of Patent: Apr. 12, 2016

(54) CONNECTOR AND SPRING ASSEMBLY FOR A GENERATOR

(71) Applicant: Hamilton Sundstrand Corporation, Windsor Locks, CT (US)

(72) Inventors: Andrew P. Grosskopf, Rockford, IL (US); Mark J. Franklin, Janesville, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 218 days.

(21) Appl. No.: 13/781,875

(22) Filed: Mar. 1, 2013

(65) Prior Publication Data

US 2014/0246957 A1  Sep. 4, 2014

(51) Int. Cl.
*H02K 9/00* (2006.01)
*H02K 11/00* (2006.01)
*F16B 2/20* (2006.01)
*H01R 4/48* (2006.01)
*H02K 11/02* (2006.01)
*H02K 11/04* (2006.01)

(52) U.S. Cl.
CPC .............. *H02K 11/0094* (2013.01); *F16B 2/20* (2013.01); *H01R 4/48* (2013.01); *H02K 11/028* (2013.01); *H02K 11/042* (2013.01); *Y10T 403/60* (2015.01)

(58) Field of Classification Search
USPC ........ 310/64, 67 R, 68 R, 68 D, 71, 72, 75 D, 310/179; 439/397, 510, 816; 174/91 R; 363/144, 145; 29/25.02; 257/726
See application file for complete search history.

(56) References Cited

U.S. PATENT DOCUMENTS

| 3,629,631 | A |   | 12/1971 | Cotton et al. |
| 3,723,794 | A |   | 3/1973 | Spisak et al. |
| 3,739,209 | A |   | 6/1973 | Drabik |
| 3,777,193 | A |   | 12/1973 | Buehner |
| 3,829,725 | A |   | 8/1974 | Petersen et al. |
| 3,852,628 | A |   | 12/1974 | Spisak et al. |
| 3,858,069 | A |   | 12/1974 | Kuter et al. |
| 3,872,335 | A |   | 3/1975 | Petersen et al. |
| 3,889,048 | A | * | 6/1975 | Groth .......................... 174/94 R |
| 3,896,348 | A |   | 7/1975 | Loderer |
| 4,007,389 | A |   | 2/1977 | Kuter |
| 4,029,981 | A |   | 6/1977 | Kuter et al. |
| 4,048,532 | A |   | 9/1977 | Kuter et al. |
| 4,052,629 | A |   | 10/1977 | Kuter et al. |
| 4,052,631 | A |   | 10/1977 | Kuter |
| 4,065,686 | A |   | 12/1977 | Moore |
| 4,079,276 | A |   | 3/1978 | Kuter |
| 4,137,560 | A |   | 1/1979 | Moore |
| 4,160,179 | A |   | 7/1979 | Allport et al. |
| 4,169,282 | A |   | 9/1979 | Allport et al. |
| 4,189,653 | A |   | 2/1980 | Hiratuka et al. |
| 4,221,982 | A |   | 9/1980 | Raver et al. |
| 4,232,238 | A |   | 11/1980 | Saito et al. |
| 4,305,121 | A |   | 12/1981 | Lack et al. |
| 4,321,664 | A |   | 3/1982 | Matthai |

(Continued)

FOREIGN PATENT DOCUMENTS

CN          202471641 U    * 10/2012

*Primary Examiner* — Tran Nguyen
(74) *Attorney, Agent, or Firm* — Kinney & Lange, P.A.

(57) ABSTRACT

An assembly includes a resistor pack, a first spring clip, and a first rigid connector. The resistor pack has a first clip-shaped cavity therein. The first spring clip is disposed within the first clip-shaped cavity and the first connector is abutted by opposing portions of the first spring clip.

16 Claims, 9 Drawing Sheets

(56) References Cited

U.S. PATENT DOCUMENTS

| | | | |
|---|---|---|---|
| 4,329,603 | A | 5/1982 | Ballard |
| 4,482,827 | A | 11/1984 | Baldwin |
| 4,532,539 | A | 7/1985 | Frister |
| 4,570,094 | A | 2/1986 | Trommer |
| 4,581,695 | A | 4/1986 | Hoppe |
| 4,591,775 | A | 5/1986 | Nussel et al. |
| 4,603,344 | A | 7/1986 | Trommer |
| 4,604,538 | A | 8/1986 | Merrill et al. |
| 4,606,000 | A | 8/1986 | Steele et al. |
| 4,628,219 | A | 12/1986 | Troscinski |
| 4,675,785 | A | 6/1987 | Young |
| 4,745,315 | A | 5/1988 | Terry, Jr. et al. |
| 4,794,510 | A * | 12/1988 | Wege ............... 363/145 |
| 4,797,590 | A | 1/1989 | Raad et al. |
| 4,827,165 | A | 5/1989 | Nold |
| 4,896,062 | A | 1/1990 | Pollard |
| 4,952,829 | A | 8/1990 | Armbruster et al. |
| 4,956,746 | A | 9/1990 | Gates, Jr. et al. |
| 4,959,572 | A | 9/1990 | Becker |
| 4,959,707 | A | 9/1990 | Pinchott |
| 4,987,328 | A | 1/1991 | Shahamat |
| 5,001,376 | A | 3/1991 | Iseman |
| 5,003,209 | A | 3/1991 | Huss et al. |
| 5,006,741 | A | 4/1991 | Schott |
| 5,012,145 | A * | 4/1991 | Frantz et al. ............... 310/68 D |
| 5,013,948 | A | 5/1991 | Tumpey et al. |
| 5,017,821 | A | 5/1991 | Shervington et al. |
| 5,065,484 | A | 11/1991 | Pinchott |
| 5,124,603 | A | 6/1992 | Hayward et al. |
| 5,136,195 | A | 8/1992 | Allen, III et al. |
| 5,138,210 | A | 8/1992 | Crickmore et al. |
| 5,166,564 | A | 11/1992 | Shahamat et al. |
| 5,191,248 | A * | 3/1993 | Huss ............... 310/68 D |
| 5,319,272 | A | 6/1994 | Raad |
| 5,331,231 | A | 7/1994 | Koplin et al. |
| 5,365,133 | A | 11/1994 | Raad |
| 5,424,593 | A | 6/1995 | Vaghani et al. |
| 5,453,648 | A | 9/1995 | Bradfield |
| 5,587,616 | A | 12/1996 | Johnsen |
| 5,737,210 | A | 4/1998 | Barahia |
| 5,772,450 | A * | 6/1998 | Bernardini ............... 439/67 |
| 5,773,903 | A | 6/1998 | McCabria et al. |
| 5,796,196 | A * | 8/1998 | Johnsen et al. ............... 310/68 D |
| 5,812,388 | A | 9/1998 | Keidar et al. |
| 5,949,166 | A | 9/1999 | Ooiwa et al. |
| 5,998,893 | A | 12/1999 | Fowler et al. |
| 6,034,452 | A | 3/2000 | Nakamura et al. |
| 6,198,188 | B1 | 3/2001 | Ihata |
| 6,275,404 | B1 | 8/2001 | Shichijyo et al. |
| 6,285,100 | B1 | 9/2001 | Pflueger et al. |
| 6,307,289 | B1 | 10/2001 | Skala |
| 6,411,536 | B1 | 6/2002 | Thor et al. |
| 6,555,937 | B2 | 4/2003 | Kurahashi et al. |
| 6,563,241 | B2 | 5/2003 | Hayashi et al. |
| 6,577,032 | B2 | 6/2003 | Irie |
| 6,580,187 | B2 | 6/2003 | Bradfield |
| 6,628,022 | B2 | 9/2003 | Clayton et al. |
| 6,661,135 | B2 | 12/2003 | Borden et al. |
| 6,707,691 | B2 | 3/2004 | Bradfield |
| 6,710,482 | B2 | 3/2004 | Mackulin et al. |
| 6,731,030 | B2 | 5/2004 | Keidar et al. |
| 6,753,637 | B2 | 6/2004 | Tornquist et al. |
| 6,812,604 | B2 | 11/2004 | Braun et al. |
| 6,828,703 | B2 | 12/2004 | Einheuser et al. |
| 6,882,069 | B1 | 4/2005 | Kashihara et al. |
| 6,903,470 | B2 | 6/2005 | Doherty et al. |
| 6,954,013 | B2 | 10/2005 | Balszunat et al. |
| 6,970,357 | B2 | 11/2005 | Hsieh |
| 7,166,943 | B2 | 1/2007 | Johnsen |
| 7,203,078 | B2 | 4/2007 | Datta et al. |
| 7,208,854 | B1 | 4/2007 | Saban et al. |
| 7,282,825 | B2 | 10/2007 | Sakakibara |
| 7,505,273 | B2 | 3/2009 | Braun et al. |
| 7,511,392 | B2 * | 3/2009 | Rubbo et al. ............... 310/68 D |
| 7,569,956 | B2 | 8/2009 | Shichijoh et al. |
| 7,570,488 | B2 | 8/2009 | Oohashi et al. |
| 7,586,224 | B2 * | 9/2009 | Osborn et al. ............... 310/68 D |
| 7,592,724 | B2 | 9/2009 | Kume |
| 7,605,502 | B2 | 10/2009 | Kondo et al. |
| 7,612,474 | B2 | 11/2009 | DePetris et al. |
| 7,616,047 | B2 | 11/2009 | Rees et al. |
| 7,633,259 | B2 | 12/2009 | Fish |
| 7,728,447 | B2 | 6/2010 | Becquerelle et al. |
| 7,855,480 | B2 | 12/2010 | Ito et al. |
| 7,855,482 | B2 | 12/2010 | Nakamura et al. |
| 7,868,494 | B2 | 1/2011 | Grosskopf et al. |
| 7,944,100 | B2 | 5/2011 | Lemmers, Jr. et al. |
| 7,948,127 | B2 | 5/2011 | McDowall et al. |
| 7,990,115 | B2 | 8/2011 | Anghel et al. |
| 8,324,747 | B2 | 12/2012 | Anghel et al. |
| 8,450,892 | B2 | 5/2013 | Patel et al. |
| 2002/0060502 | A1 | 5/2002 | Irie |
| 2002/0079757 | A1 | 6/2002 | Bradfield |
| 2002/0163260 | A1 | 11/2002 | Kusase et al. |
| 2003/0042808 | A1 | 3/2003 | Keidar et al. |
| 2003/0137201 | A1 | 7/2003 | Nakano |
| 2005/0146236 | A1 | 7/2005 | Kashihara |
| 2006/0131969 | A1 | 6/2006 | DePetris et al. |
| 2006/0138882 | A1 | 6/2006 | Sakakibara |
| 2006/0163957 | A1 | 7/2006 | Johnsen |
| 2006/0192446 | A1 | 8/2006 | Ihata et al. |
| 2006/0284499 | A1 | 12/2006 | Rubbo et al. |
| 2007/0108854 | A1 | 5/2007 | Osborn et al. |
| 2008/0218035 | A1 | 9/2008 | Naghshineh |
| 2008/0218036 | A1 | 9/2008 | Fakult et al. |
| 2008/0265700 | A1 | 10/2008 | Bradfield et al. |
| 2009/0040121 | A1 * | 2/2009 | Rosenberger et al. ........ 343/713 |
| 2010/0019628 | A1 | 1/2010 | Kitzmiller et al. |
| 2010/0213775 | A1 | 8/2010 | Naghshineh |
| 2010/0259137 | A1 | 10/2010 | Goerlach et al. |
| 2010/0283357 | A1 | 11/2010 | Lemmers, Jr. et al. |
| 2010/0283358 | A1 * | 11/2010 | Ganong et al. ............... 310/75 D |
| 2012/0007360 | A1 | 1/2012 | Anghel et al. |
| 2012/0188810 | A1 | 7/2012 | Wohlfarth et al. |
| 2012/0195003 | A1 | 8/2012 | Ford et al. |

* cited by examiner

CONNECTOR AND SPRING ASSEMBLY FOR A GENERATOR

BACKGROUND

The present disclosure is related to generators, and in particular to a rotating resistor pack and connectors employed in a generator.

A typical generator assembly includes a rotor portion and a stator portion. Mechanical energy is provided to the generator via a shaft connected to the rotor portion that is converted into electrical energy that is provided via the stator portion.

Many generators take advantage of three stages, including a permanent magnet stage, an exciter stage and a main stage. The exciter stage includes an exciter stator winding for receiving DC power that energizes the exciter stator and generates the desired magnetic field. Rotational energy provided by the shaft causes the exciter rotor to move through the magnetic field, resulting in the generation of alternating current (AC) electric power in the exciter rotor. A rotating rectifier assembly is mounted within the rotor for converting the AC power to a direct current (DC) electric power that is supplied to the main rotor winding. The DC power provided to the rotating main rotor winding results in a rotating magnetic field that generates AC power in the stator windings.

Suppression resistors may also be included within or nearby the rotating rectifier assembly to provide an alternate path for voltage and current transients and protect the rotating rectifier assembly. However, the rotating rectifier assembly and the suppression resistors are mounted on the rotating shaft, and are therefore subject to the centrifugal forces associated with the rotating shaft.

SUMMARY

An assembly includes a resistor pack, a first spring clip, and a first rigid connector. The resistor pack has a first clip-shaped cavity therein. The first spring clip is disposed within the first clip-shaped cavity and the first connector is abutted by opposing portions of the first spring clip.

In another aspect, a generator includes a rotor shaft, a rectifier, a resistor pack, a main field winding, a first spring clip, and a first rigid connector. The rotor shaft has an inner diameter in which the rotating rectifier assembly and resistor pack are located. The resistor pack is located axially adjacent to the rectifier and includes a first clip-shaped cavity therein. The main field winding has an end turn support disposed adjacent the resistor pack. The first spring clip is disposed within the first clip-shaped cavity and the first connector is abutted by opposing portions of the first spring clip. The first connector extends from the resistor pack to connect to the end turn support.

In yet another aspect, a spring clip includes first and second curved end portions, first and second electrical contact portions, and a curved middle portion. The first and second curved end portions are bi-symmetrically arranged opposite one another. The first curved end portion extends from and is disposed inward of the first curved end portion and the second curved end portion extends from and is disposed inward of the second curved end portion such that the first and second electrical contact portions are bi-symmetrically arranged and spaced from one another. The curved middle portion is connected between the first and second electrical contact portions. The first and second electrical contact portions adjacent the curved middle portion are spaced further apart from one another than the first and second electrical contact portions adjacent the first and second curved end portions.

DETAILED DESCRIPTION

This description relates to an assembly for a generator with a resistor pack coupled to a rotor shaft. The resistor pack is subject to centrifugal forces associated with rotation of rotor shaft during operation. Typically, these centrifugal forces negatively impact electrical connections such as solder joints on wires between a resistor pack and the main field winding. The addition of rigid connectors and spring clips to the generator eliminates the need for wires between resistor pack and main field winding in order to communicate rectified DC voltage between resistor pack and main field winding. As a result, the negative effects of centrifugal forces on the wire type connections are reduced.

Figure 1:
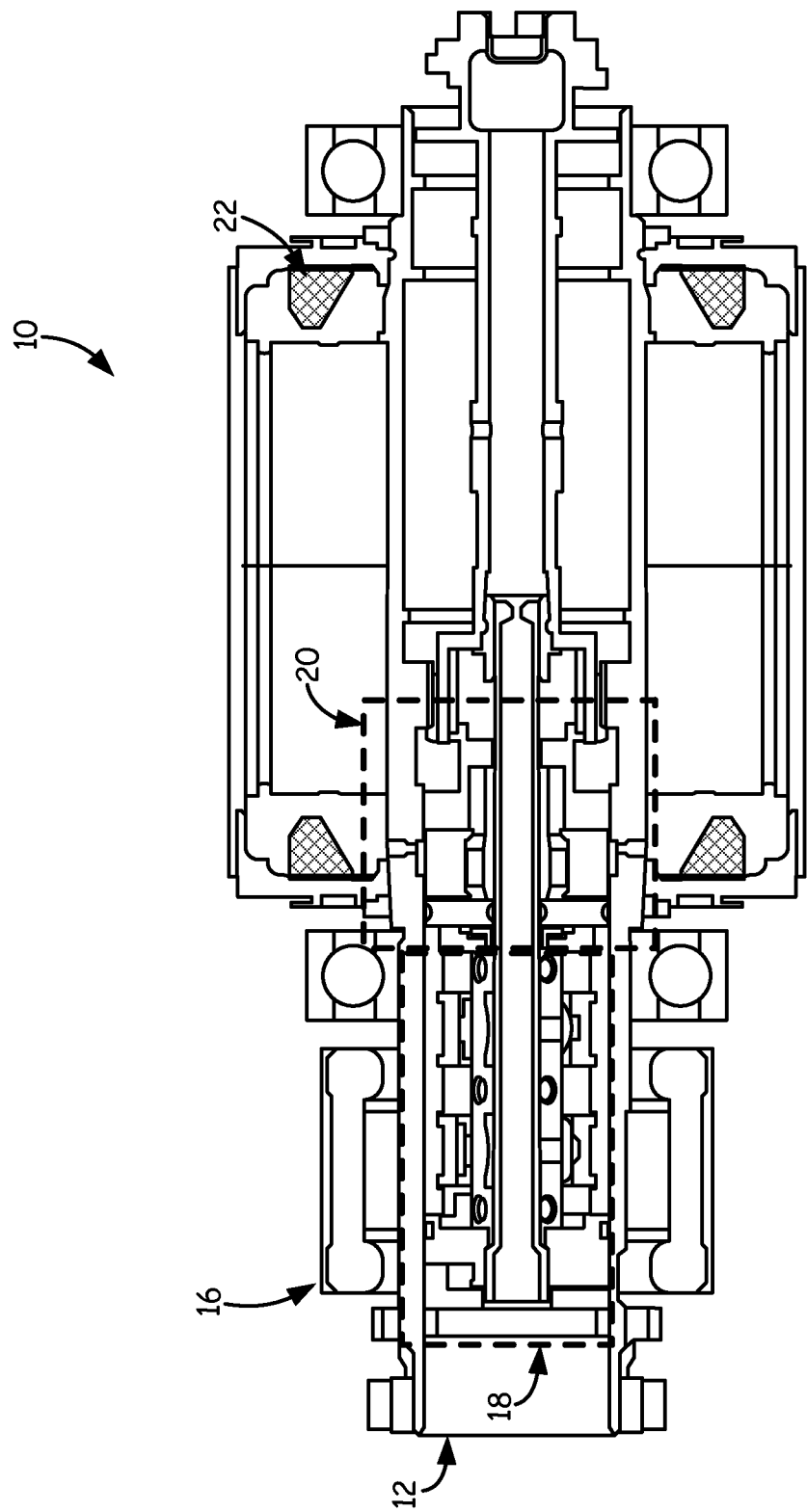
FIG. 1 is a cross-sectional view of rotating components included in a variable frequency generator according to an embodiment of the present invention.

FIG. 1 is a cross-sectional view of rotating components included in generator 10 according to an embodiment of the present invention. Generator 10 includes rotor shaft 12, exciter rotor 16, rectifier assembly 18, resistor pack 20, and main field winding 22. Rotor shaft 12 communicates mechanical energy to the rotating components mounted on the shaft, including exciter rotor 16, rectifier assembly 18, resistor pack 20, and main field winding 22.

DC voltage is supplied to the stator windings (not shown) located adjacent to the exciter rotor 16. Exciter rotor 16 rotates with rotor shaft 12, and generates an alternating current (AC) voltage in response to a magnetic field generated by an exciter stator (not shown) located adjacent to exciter rotor 16. The AC voltage is supplied to rectifier assembly 18, which rectifies the AC voltage to a rectified DC voltage. Resistor pack 20 receives the rectified DC voltage, and communicates the rectified DC voltage to main field winding 22.

Both rectifier assembly 18 and resistor pack 20 are mounted within an inner diameter of rotor shaft 12, and are therefore subjected to centrifugal forces associated with the rotation of rotor shaft 12. A benefit of locating rectifier assembly 18 and resistor pack 20 within the inner diameter of rotor shaft 12, is that rectifier assembly 18 and resistor pack 20 are structurally supported by rotor shaft 12. Locating components within the inner diameter (ID) of rotor shaft 12 forces the shaft to a certain size to accommodate the components and adds to the stiffness of rotor shaft 12. Increased shaft stiffness increases a maximum obtainable speed of rotor shaft 12.

Figure 2:
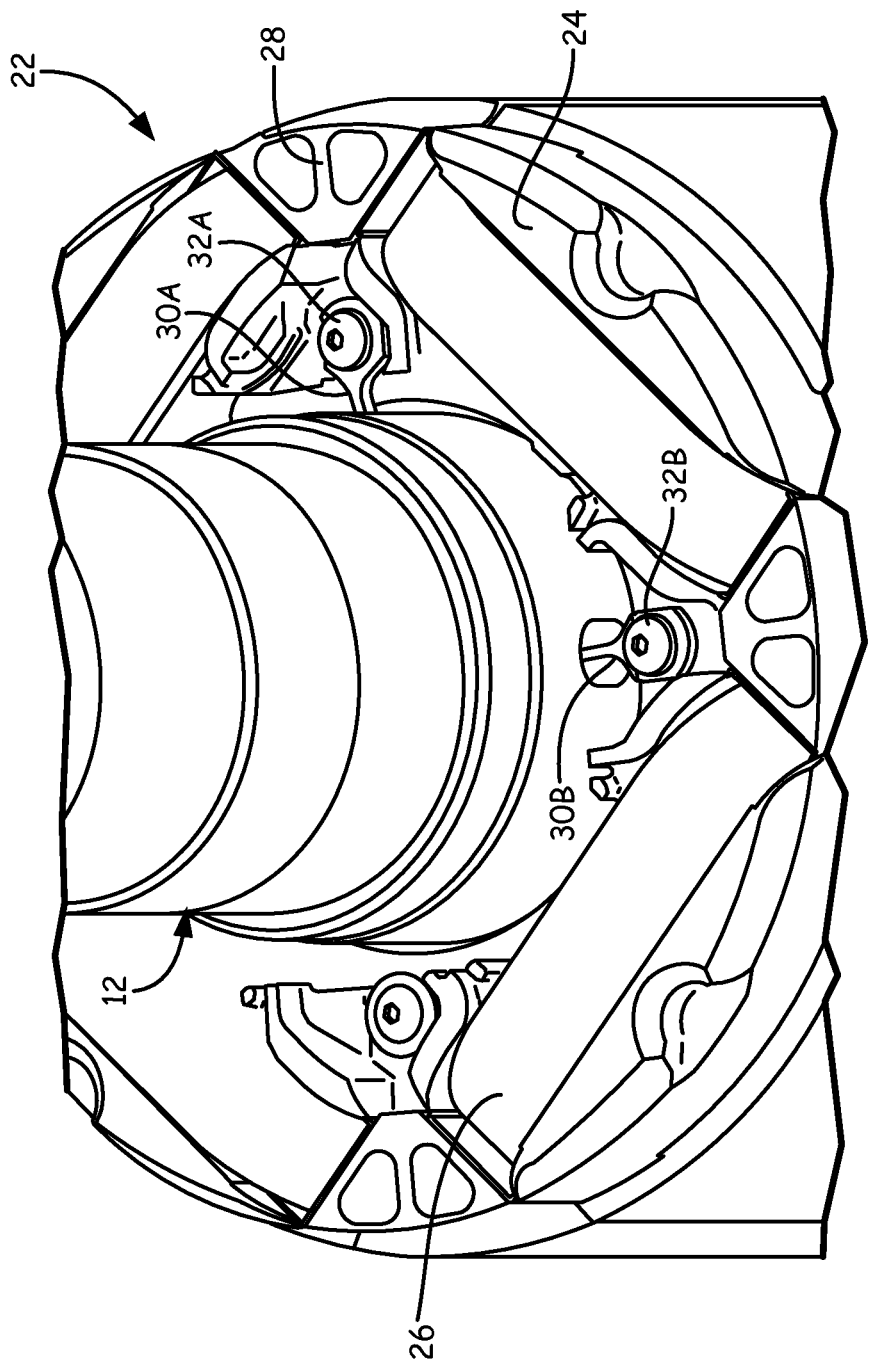
FIG. 2 is a perspective view of a portion of a rotor shaft and a portion of main field winding of variable frequency generator.

FIG. 2 is a perspective view of rotor shaft 12 and a portion of main field winding 22. Main field winding 22 includes end turn support 24, coils 26 (a subset of the main field windings 22), and wedges 28.

Rotor shaft 12 is disposed radially inward of main field winding 22 and rotates therewith. In FIG. 2, end turn support 24, coils 26, and wedges 28 are positioned around rotor shaft 12. Connectors 30A and 30B (first connector 30A comprising a DC negative and second connector 30B comprising a DC positive) are mounted to end turn support 24 by fasteners 32A and 32B. Connectors 30A and 30B and fasteners 32A and 32B are disposed adjacent to and are in electrical connection with coils 26 mounted in end turn support 24. Coils 26 are held by wedges 28 inserted between end turn support 24 and coils 26.

Connectors 30A and 30B extend from end turn support 24 into rotor shaft 12. As will be discussed subsequently, connectors 30A and 30B are formed of a rigid electrically conductive material such as a metal alloy. In one embodiment, end turn support 24 can be configured with joints 33A, 33B, and 33C. These joints 33A, 33B, and 33C allow the fasteners 32A and 32B and connectors 30A and 30B to shift radially outward relative to rotor shaft 12 during operation. For example, joints 33A, 33B, and 33C allow connectors 30A and 30B to move radially outward in response to centrifugal forces transferred to connectors 30A and 30B. This reduces stresses on end turn support 24, connectors 30A and 30B, and other components. In yet another embodiment, connectors 30A and 30B are made from beryllium-copper and plated with silver to reduce the likelihood of corrosion and facilitate conduction. In operation, connectors 30A and 30B communicate the rectified DC voltage to coils 26 of main field winding 22.

Figure 3:
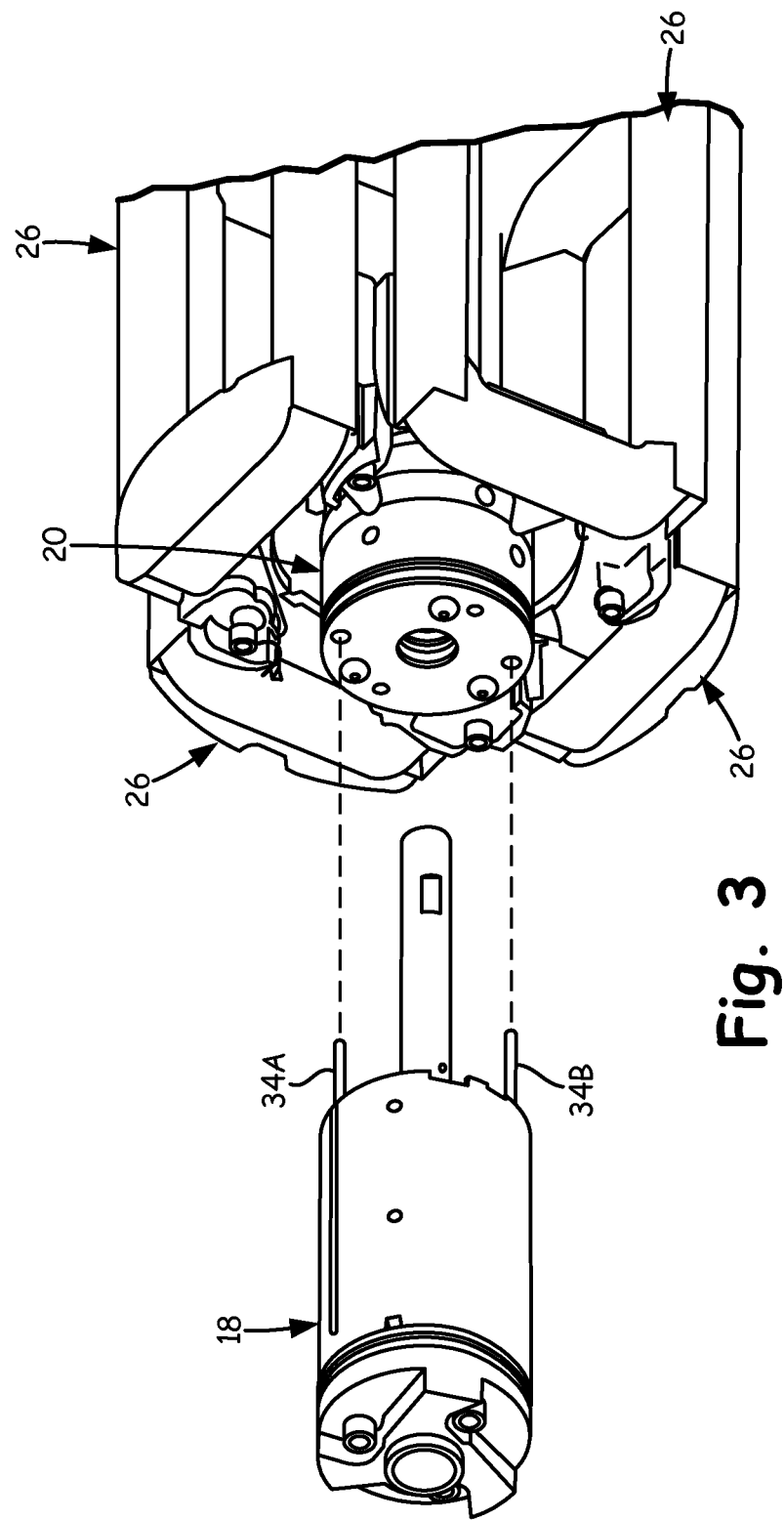
FIG. 3 is an exploded view that illustrates the connection of a rectifier assembly to a resistor pack according to an embodiment of the present invention.

FIG. 3 is an exploded view that illustrates the connection of rotating rectifier assembly 18 to resistor pack 20 according to an embodiment of the present invention. In the embodiment shown in FIG. 3, resistor pack 20 is shown mounted within main field winding 22, but with rotor shaft 12 removed from the view to prevent obscuration of resistor pack 20. Rectifier assembly 18 includes diode plugs 34A and 34B extending axially away from rectifier assembly 18. First and second diode plugs 34A and 34B are received in resistor pack 20.

Figure 3A:
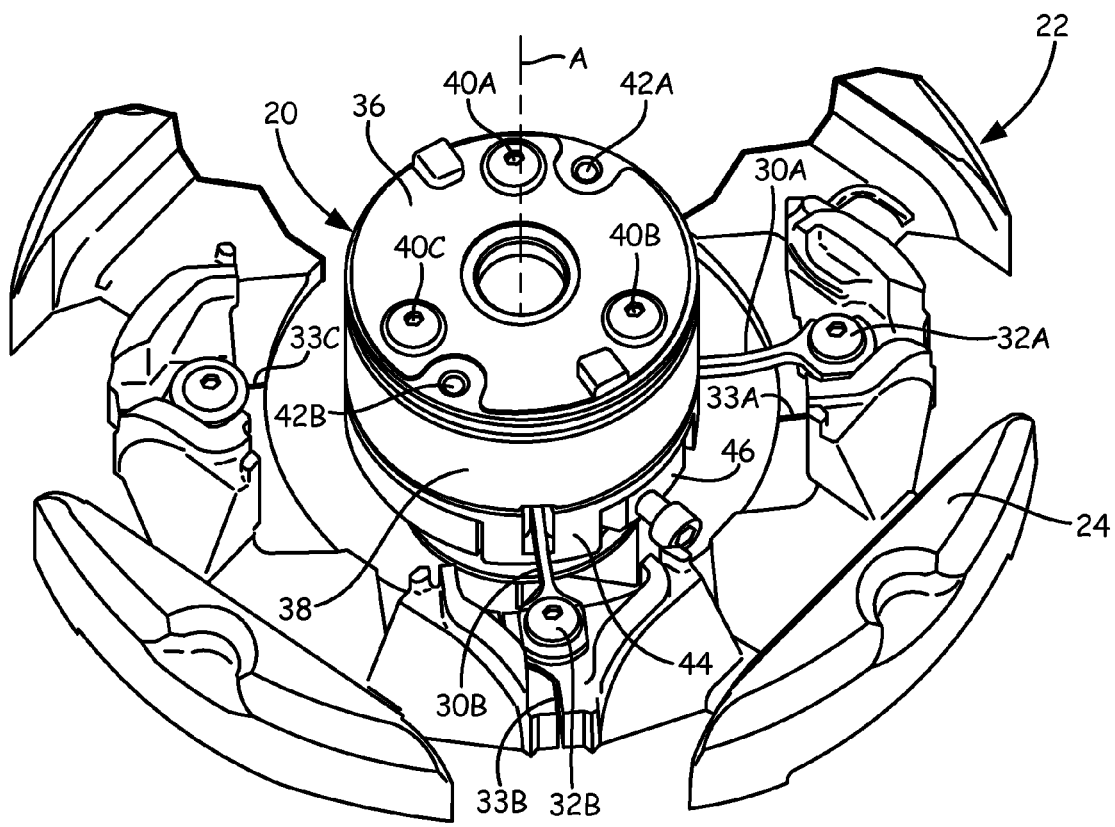
FIG. 3A is a perspective view of resistor pack, connections, and main field winding according to an embodiment of the present invention.

FIG. 3A shows a perspective view of resistor pack 20 mounted adjacent end turn support 24 of main field winding 22 (FIG. 1). Similar to FIG. 3, in FIG. 3A rotor shaft 12 is removed from the view to prevent obscuration of resistor pack 20. Additionally, rectifier assembly 18, coils 26 and wedges 28 are removed from FIG. 3A. Resistor pack 20 includes plate 36, cover 38, fasteners 40A, 40B, and 40C, apertures 42A and 42B, support housing 44, and support 46.

Plate 36 is disposed at a first axial end of resistor pack 20 and interfaces with rectifier assembly 18 (FIG. 3). Plate 36 is connected to cover 38 by fasteners 40A, 40B, and 40C. Cover 38 is disposed beneath plate 36 and extents axially away from plate 36. Cover 38 is adapted with apertures 42A and 42B, which receive diode plugs 34A and 34B of rectifier assembly 18 (FIG. 3). Additionally, cover 38 houses and structurally supports internal components of resistor pack 20 therein. Cover 38 is mounted on support housing 44. Support housing 44 is adapted to receive a distal radially inward extending portion of connectors 30A and 30B therein. Support housing 44 is mounted on support 46. Support 46 is adapted to receive and mate with support housing 44. Like plate 36, cover 38, and support housing 44, support 46 extends outward radially from axis A.

In one embodiment, plate 36 is a flat disk shaped thin piece of hard material. In particular, plate 36 can be constructed of a metal alloy such as steel. This plate 36 distributes the clamping load of the fasteners 40A, 40B and 40C to prevent deforming cover 38. Cover 38 and support housing 44 are comprised of an electrically insulating material such as Torlon®. Support 46 can be comprised of a strong structural material such as steel.

Figure 4:
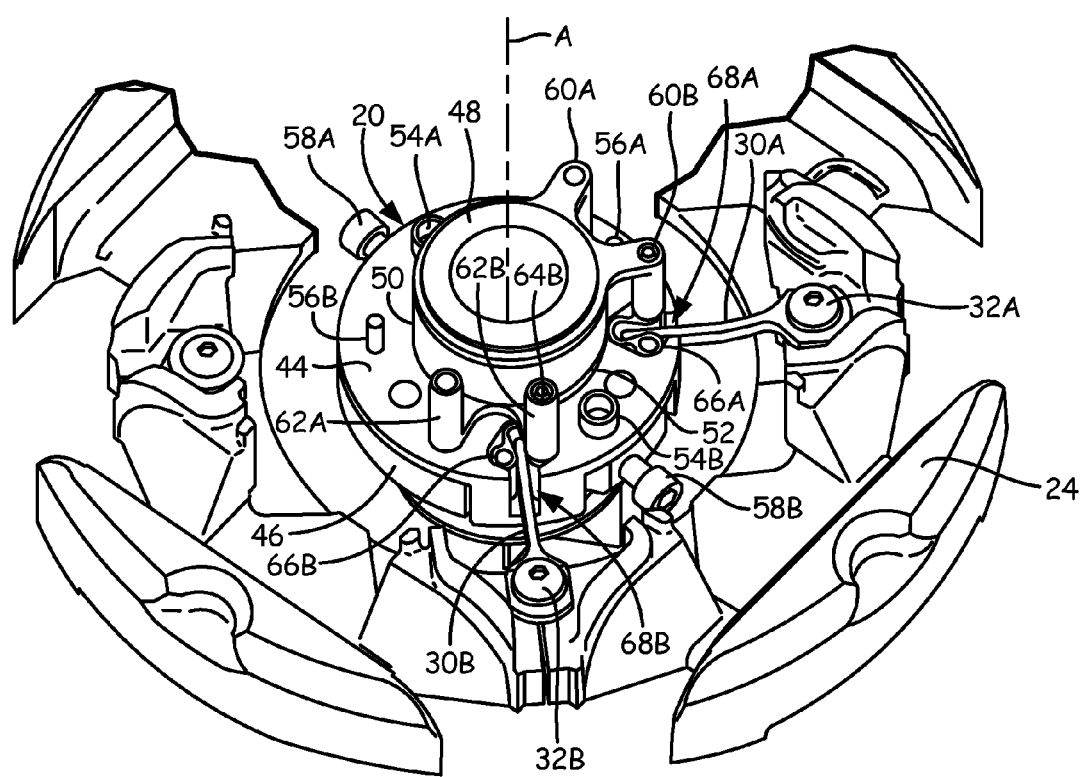
FIG. 4 is a perspective view of internal components of the resistor pack of FIG. 3A including DC plates, a resistor, and a support housing.

FIG. 4 shows one embodiment of resistor pack 20 with plate 36 and cover 38 (FIG. 3A) removed to illustrate components internal to cover 38. These components include first DC plate 48, resistor 50, second DC plate 52, springs 54A and 54B, pins 56A and 56B, and fasteners 58A and 58B. First DC plate 48 includes connection terminals 60A and 60B. Second DC plate 52 includes connection terminals 62A and 62B.

First DC plate 48 is disposed about axis A and is mounted to resistor 50. Second DC plate 52 is disposed between resistor 50 and support housing 44. Thus, resistor 50 is disposed between first DC plate 48 and second DC plate 52. Springs 54A and 54B are disposed on support housing 44 and extend axially outward therefrom. Springs 54A and 54B are disposed on opposing sides of resistor 50 and second DC plate 52 from one another. Pins 56A and 56B extend radially from support housing 44 and are disposed on opposing sides of resistor 50 and second DC plate 52 from one another. Fasteners 58A and 58B extend into an outer radial surface of support 46 and are disposed on opposing sides of support 46 from one another. Fasteners 58A and 58B connect rotor shaft 12 (FIGS. 1 and 2) to resistor pack 20 and provides axial locating of resistor pack 20 within rotor shaft 12.

Connection terminal 60A extends radially away from the remainder of first DC plate 48 and extends axially toward support housing 44. Connection terminal 60A is adapted to receive and form an electrical connection with first diode plug 34A of rectifier assembly 18 (FIG. 3). Connection terminal 60B extends radially away from the remainder of first DC plate 48 and extends axially toward support housing 44. Connection terminal 60B is spaced circumferentially from connection terminal 60A. As will be discussed in greater detail subsequently, connection terminal 60B is adapted to receive first pin 64A therein. First pin 64A extends generally axially from connection terminal 60B and is received by first spring clip 66A disposed in clip-shaped cavity 68A in support housing 44.

Similarly, connection terminal 62A extends radially away from the remainder of second DC plate 52 and extends axially away from support housing 44. Connection terminal 62A is adapted to receive and form an electrical connection with second diode plug 34B of rectifier assembly 18 (FIG. 3). Connection terminal 62B extends radially away from the remainder of second DC plate 52 and extends axially away from support housing 44. Connection terminal 62B is spaced circumferentially from connection terminal 62A. As will be discussed in greater detail subsequently, connection terminal 62B is adapted to receive second pin 64B therein. Second pin 64B extends generally axially from connection terminal 62B and is received by second spring clip 66B disposed in clip-shaped cavity 68B in support housing 44.

In the embodiment shown, resistor 50 comprises a cylindrical suppression resistor. Contact at a first interface between first DC plate 48 and resistor 50 provides an electrical connection between first DC plate 48 and resistor 50. Similarly, contact at a second interface between second DC plate 52 and resistor 50 provides an electrical connection between second DC plate 52 and resistor 50. In the embodiment shown in FIG. 4, resistor 50 is a ceramic resistor, although in other embodiments various materials may be employed. Additionally, rectifier assembly 18 includes a cylindrical grounding resistor (not shown) that provides a ground fault path through rotor shaft 12 (FIGS. 1 and 2). This grounding resistor prevents a build-up of charge on main field windings 22 that can damage the diodes in rectifier assembly 18 when discharged. A ground path with resistance limits the amount of static charge that can build up prior to discharge.

Springs 54A and 54B preload support housing 44 against housing 46. This preloaded arrangement allows for precise tolerances between the surfaces of support housing 44 and housing 46, as well as between support housing 44 and other components such as spring clips 66A, 66B and connectors 30A, 30B. Springs 54A and 54B can comprise any bias element capable of providing a preload such as a wave spring or a helical spring. In some embodiments, springs 54A and 54B can be constructed of corrosion resistant material such as stainless steel.

Pins 56A and 56B allow cover 38 (FIG. 3A) to be arranged circumferentially so as to align apertures 42A and 42B with connection terminals 60A and 62A. Fasteners 58A and 58B connect rotor shaft 12 (FIGS. 1 and 2) to resistor pack 20. Thus, fasteners 58A and 58B axially locate and hold resistor pack 20 to rotor shaft 12.

In operation, first DC plate 48 and second DC plate 52 receive rectified DC voltage and communicate the rectified DC voltage to main field winding 22. In particular, first pin 64A makes a DC negative electrical connection between first DC plate 48 and main field winding 22 via first spring clip 66A and first connector 30A. Second pin 64B makes a DC positive electrical connection between second DC plate 52 and main field winding 22 via first spring clip 66B and second connector 30B.

Resistor pack 20 is coupled to rotor shaft 12, and therefore, is subject to the centrifugal forces associated with rotation of rotor shaft 12. These centrifugal forces negatively impact electrical connections such as solder joints on wires between resistor pack 20 and main field winding 22 in some circumstances causing either the joints or wires to break. The addition of rigid connectors 30A and 30B and spring clips 66A and 66B eliminates the need for solder joints between resistor pack 20 and main field winding 22 in order to communicate rectified DC voltage between resistor pack 20 and main field winding 22. The spring loaded joint allows the connectors 30A and 30B to move in the spring clips 66A and 66B and maintain electrical connection. Thus, as a result of rigid connectors 30A and 30B and spring clips 66A and 66B failures due to centrifugal forces on wires and solder joints can be eliminated.

Figure 5A:
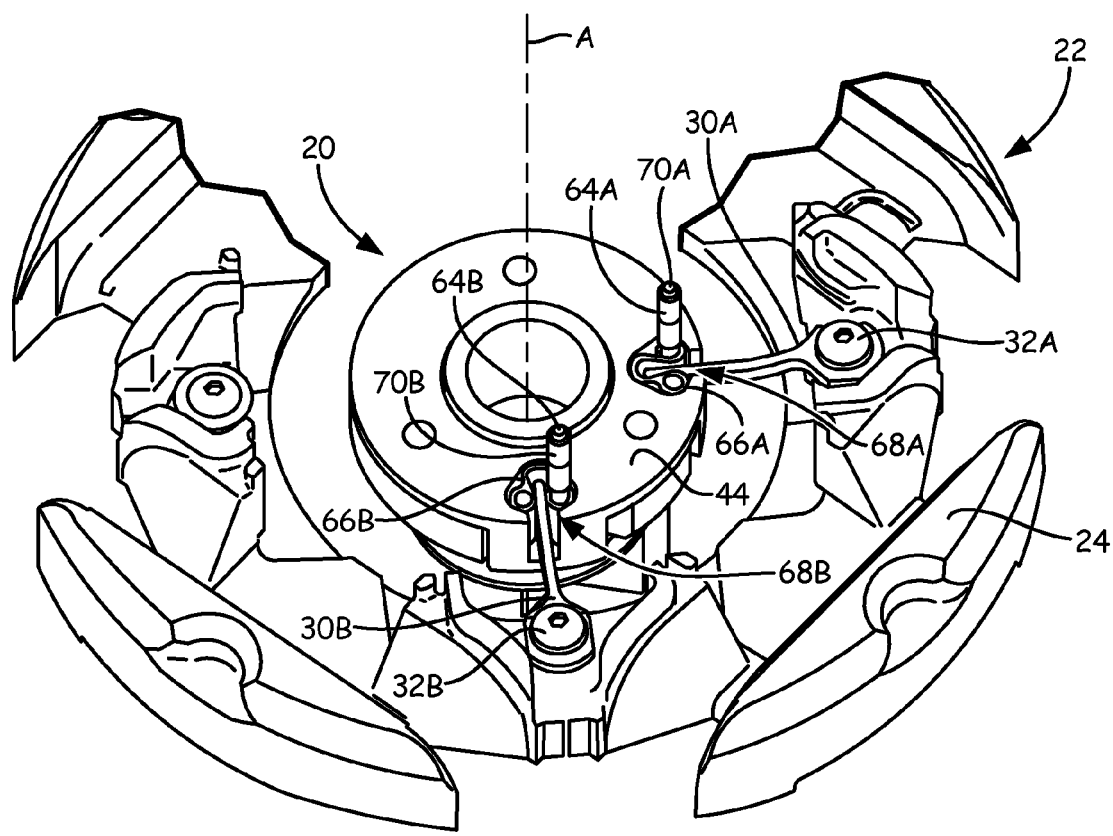
FIG. 5A is a perspective view of connectors, spring clips, and internal components of the resistor pack of FIG. 3A including clip-shaped cavities.
Figure 5B:
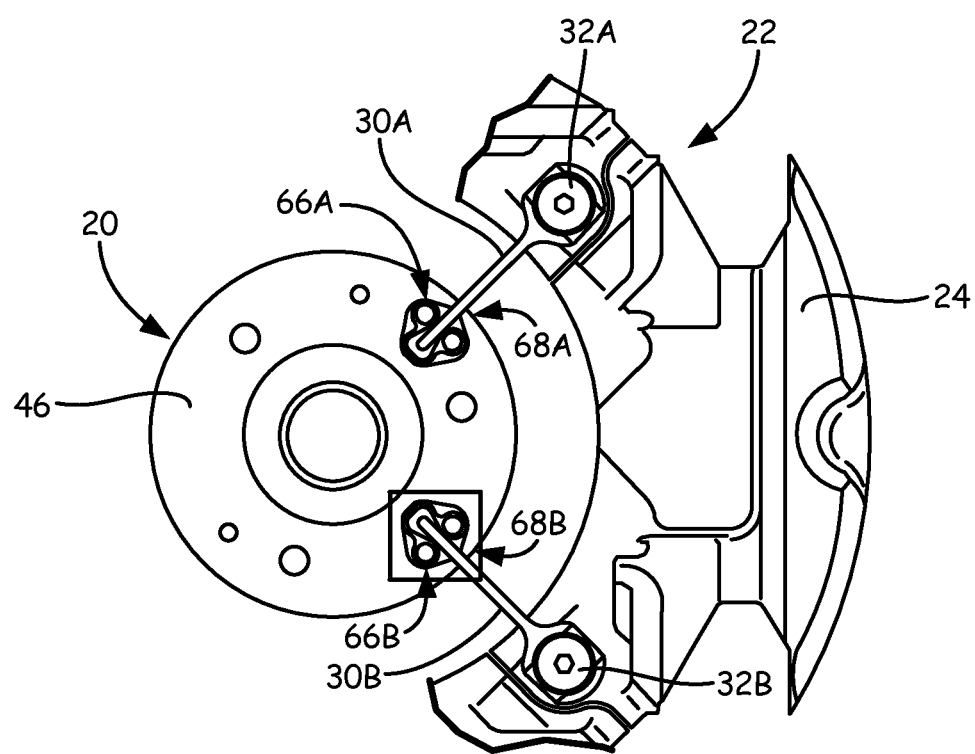
FIG. 5B is a planar view of the connectors, spring clips, and components of the resistor pack of FIG. 5A.

FIGS. 5A and 5B show resistor pack 20 with plate 36, cover 38, first DC plate 48, resistor 50, second DC plate 52, and springs 54A and 54B removed. FIG. 5A provides a perspective view of resistor pack 20. FIG. 5B shows a planar view of resistor pack 20 along axis A. FIGS. 5A and 5B show end turn support 24, connectors 30A and 30B, fasteners 32A and 32B, pins 64A and 64B, spring clips 66A and 66B and clip-shaped recesses 68A and 68B. FIG. 5A additionally illustrates power bands 70A and 70B.

As shown in FIGS. 5A and 5B, connectors 30A and 30B are mounted to end turn support 24 by fasteners 32A and 32B. Connector 30A extends into clip-shaped recess 68A within support housing 44. Within clip-shaped recess 68A, opposing surfaces of the distal end of connector 30A are contacted and held by clamping force of spring clip 66A. Similarly, connector 30B extends into clip-shaped recess 68B within support housing 44. Within clip-shaped recess 68B, opposing surfaces of the distal end of connector 30B are contacted and held by clamping force of spring clip 66B.

Pin 64A extends into clip-shaped recess 68A and is received in a first end portion of spring clip 66A. Similarly, pin 64B extends into clip-shaped recess 68B and is received in a first end portion of spring clip 66B. In the embodiment shown in FIG. 5A, power bands 70A and 70B are part of first DC plate 48 and second DC plate 52 within the sleeve-like aperture of connection terminals 60B and 62B and are disposed around pins 68A and 68B, respectively.

Power bands 70A and 70B are hollow sleeves that fit within the sleeve-like aperture of connection terminals 60B and 62B (FIG. 4). Power bands 70A and 70B are conductors that are configured to provide for better electrical connection between pins 64A and 64B and connection terminals 60B and 62B and also allow for some rotational movement of spring clips 66A and 66B about connection terminals 60B and 62B.

Figure 5C:
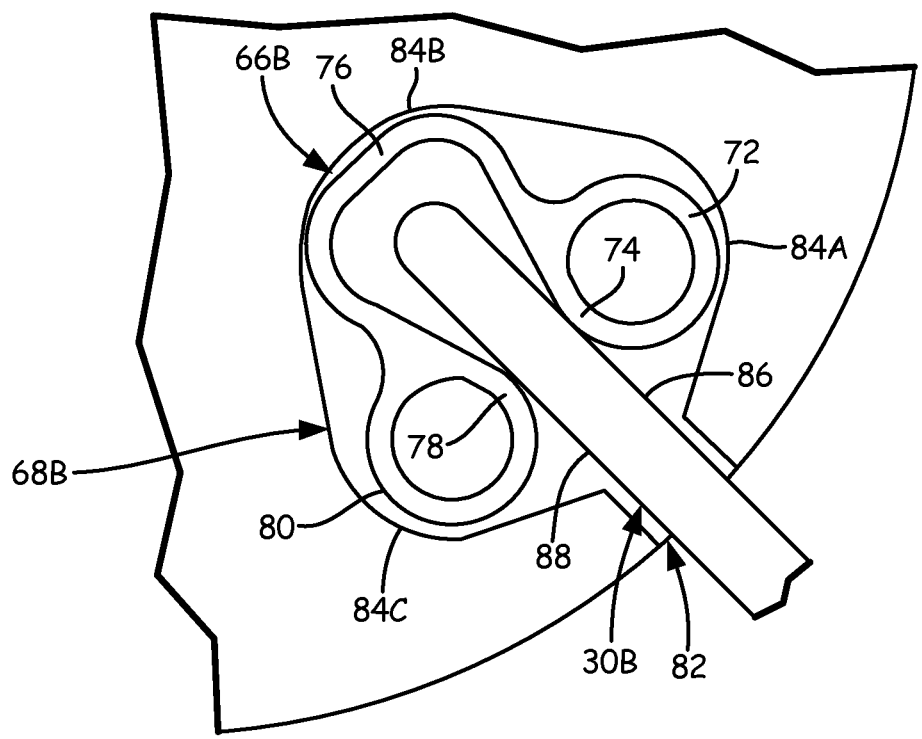
FIG. 5C is an enlarged view of one of the spring clips and clip-shaped shaped cavities from FIG. 5B.

FIG. 5C shows an enlargement of connector 30B, pin 64B, spring clip 66B, and clip-shaped recess 68B from FIG. 5B. The embodiment of spring clip 66B illustrated in FIG. 5C, includes first end portion 72, first contact portion 74, curved middle 76, second contact portion 78, and second end portion 80. Clip-shaped recess 68B includes passage 82, and first, second, and third contact locations 84A, 84B, and 84C.

As shown in the embodiment of FIG. 5C, spring clip 66B is disposed within clip-shaped recess 68B and has a bi-symmetrical/mirrored shape similar to the Greek letter omega. In the embodiment shown, first end portion 72 is a closed loop and is adapted to receive pin 64B therein. First contact portion 74 extends inward of first end portion 72 and an inner surface of first contact portion 74 contacts and holds a first interfacing surface 86 of connector 30B.

First contact portion 74 extends outward with increasing distance away from second contact portion 78 as first contact portion 74 transitions to curved middle 76. Curved middle 76 bends back to transition to second contact portion 78. Similar to first contact portion 74, second contact portion 78 bends inward and includes an inner surface that contacts and holds a second interfacing surface 88 of connector 30B. Second contact portion 78 transitions to second end portion 80. Second end portion 80 is a closed loop and forms a complete ring.

Spring clip 66B and clip-shaped recess 68B are configured to allow spring clip 66B to retain connector 30B to allow for electrical connection. In particular, passage 82 allows distal end of connector 30B to enter support housing 44 and enter the remainder of clip-shaped recess 68B. Curved first contact location 84A along clip-shaped recess 68B interfaces with and may abut first end portion 72. Similarly, curved second contact location 84B interfaces with and may abut curved middle 76 and curved third contact location 84C interfaces with and may abut second end portion 80. The close fit arrangement of spring clip 66B with clip-shaped recess 68B allows for some tolerance and "self adjusting" location. The geometry of clip-shaped recess 68B with contact locations at first, second, and third contact locations 84A, 84B, and 84C and spring clip 66B with first end portion 72, curved middle 76, and second end portion 80 forces first and second contact portions 74 and 78 toward one another and brings first and second contact portions 74 and 78 into abutment with opposing first and second surfaces 86 and 88 of connector 30B. Thus, the geometry of spring clip 66B and clip-shaped recess 68B result in a clamping force being applied on pin 64B as well as a clamping force being applied to connector 30B by spring clip 66B.

Figure 6:
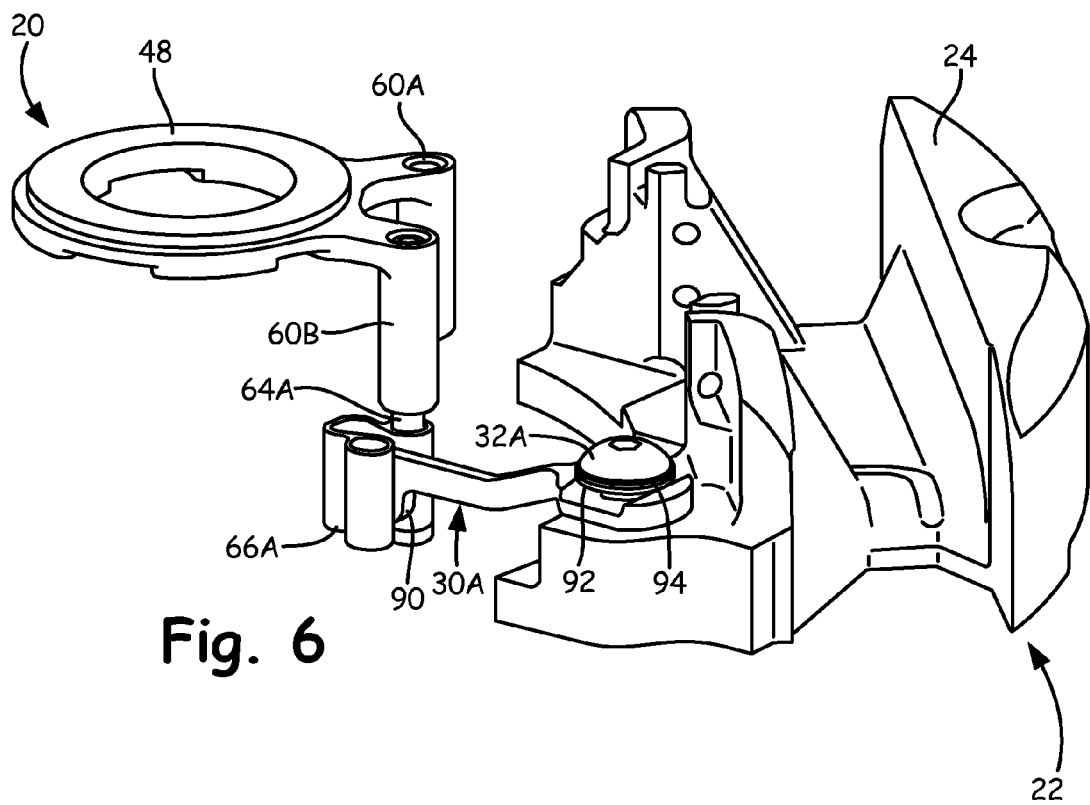
FIG. 6 is a perspective view of the DC plate, a pin, the spring clip and the connector according to one embodiment of the invention.

FIG. 6 shows a perspective view of first DC plate 48 connected to pin 64A, spring clip 66A, connector 30A, fastener 32A, and a portion of end turn support 24. As shown in FIG. 6, distal end of connector 30A includes a widened portion 90 that is captured between spring clip 66A. Thus, connector 30A has a modified spade or shovel shape. Widened portion 90 allows for more surface area of connector 30A to be contacted by spring clip 66A to provide for a better electrical connection there between.

As illustrated in the embodiment of FIG. 6, connector 30A extends from widened portion 90 and can change axial height to reach fastener 32A and end turn support 24. In other embodiments, connector 30A may not change axial height between spring clip 66A and end turn support 24. Washers 92 and 94 can be applied between fastener 32A and proximal end of connector 30A to clamp a wire from each of the start and finish coil 26 of windings 22.

As discussed previously, resistor pack 20 is coupled to rotor shaft 12, and therefore, is subject to the centrifugal forces associated with rotation of rotor shaft 12. These centrifugal forces negatively impact electrical connections such as solder joints and wires between resistor pack 20 and main field winding 22 in some circumstances causing the joints or wires to break. The addition of rigid connectors 30A and 30B and spring clips 66A and 66B, which are held together to form an electrical connection, eliminates the need for solder joints and wires between resistor pack 20 and main field winding 22 in order to communicate rectified DC voltage between resistor pack 20 and main field winding 22. Thus, as a result of rigid connectors 30A and 30B and spring clips 66A and 66B, failures due to centrifugal forces on solder joints and wires can be eliminated.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
   a resistor pack having a support housing including a first clip-shaped cavity therein and a suppression resistor mounted thereon;
   a first spring clip having an omega shape with first and second curved end portions, the spring clip, including the first and second curved end portions, being disposed within the first clip-shaped cavity; and
   a first connector abutted by opposing portions of the first spring clip wherein the connector extends radially outward from the clip; and
   a pin, wherein the pin is received by the first curved end portion of the first spring clip.

2. The assembly of claim 1, wherein the first spring clip contacts three locations along a wall of the first clip-shaped cavity.

3. The assembly of claim 1, wherein the first connector has a rigid body and extends into the resistor pack through a passageway of the first clip-shaped cavity.

4. The assembly of claim 1, wherein the first connector includes a widened distal end that is clamped between the first and second curved end portions of the first spring clip.

5. The assembly of claim 1, wherein the resistor pack includes an insulating support housing that surrounds and forms the clip-shaped cavity.

6. The assembly of claim 1, wherein the resistor pack includes a second clip-shaped cavity, and further including:
   a second spring clip disposed within the second clip-shaped cavity; and
   a second rigid connector abutted by opposing portions of the second spring clip.

7. The assembly of claim 6, the resistor pack further including:
   a first pin and a second pin;
   a first mounting plate having a circular face and a first connection terminal;
   a second mounting plate having a circular face and a second connection terminal; and
   a cylindrical suppression resistor that has a first flat surface and a second flat surface opposite the first flat surface, wherein the cylindrical suppression resistor is located between the first mounting plate and the second mounting plate, wherein the first pin is received in the first connection terminal and extends to be received by the first curved end portion of the first spring clip, and wherein the second pin is received in the second connection terminal and extends to be received by a first curved end portion of the second spring clip.

8. The assembly of claim 7, further including:
   a power band that fits within the first connection terminal, wherein the power band is configured to receive the first pin.

9. The assembly of claim 1, further including a main field winding with an end turn support disposed adjacent the resistor pack and connected to the first connector, wherein the end turn support includes one or more joints adapted to allow the first connector to shift away from the resistor pack.

10. A generator comprising:
    a rotor shaft having an inner diameter;
    a rectifier located within the inner diameter of the rotor shaft;
    a resistor pack located axially adjacent to the rectifier and within the inner diameter, wherein the resistor pack has a support housing that includes first and second clip-shaped cavities therein and has a suppression resistor mounted thereon;
    a main field winding with an end turn support disposed adjacent the resistor pack;
    first and second spring clips, each of the first and second spring clips having first and second curved end portions, wherein the first and second spring clips, including the first and second curved end portions, are disposed within the first and second clip-shaped cavities, respectively; and
    first and second rigid connectors, wherein the first connector is abutted by opposing portions of the first spring clip and the second connector is abutted by opposing portion of the second spring clip, and wherein the first and second connectors extend radially outward from the resistor pack to connect to the end turn support.

11. The generator of claim 10, wherein the end turn support includes one or more joints adapted to allow the first connector to shift away from the resistor pack.

12. The generator of claim 10, the resistor pack further including:
    a first pin and a second pin;
    a first mounting plate having a circular face and a first connection terminal;

a second mounting plate having a circular face and a second connection terminal; and a cylindrical suppression resistor that has a first flat surface and a second flat surface opposite the first flat surface, wherein the cylindrical suppression resistor is located between the first mounting plate and the second mounting plate, wherein the first pin is received in the first connection terminal and extends to be received by the first curved end portion of the first spring clip, and wherein the second pin is received in the second connection terminal and extends to be received by a first curved end portion of the second spring clip.

13. A spring clip comprising:

first and second closed loop end portions bi-symmetrically arranged and spaced from one another and configured to receive a pin therein, wherein the first and second closed loop end portions are biased toward one another to provide a clamping force;

first and second electrical contact portions, wherein the first electrical contact portion extends from and is disposed inward of the first closed loop end portion, wherein the second electrical contact portion extends from and is disposed inward of the second closed loop end portion such that the first and second electrical contact portions are bi-symmetrically arranged and spaced from one another; and a curved middle portion connected between the first and second electrical contact portions, wherein the first and second electrical contact portions adjacent the curved middle portion are spaced further apart from one another than the first and second electrical contact portions adjacent the first and second closed loop end portions.

14. The spring clip of claim 13, further comprising a connector, wherein the first and second electrical contact portions contact opposing surfaces of the connector and hold the connector with a clamping force.

15. The assembly of claim 1, wherein each of the first and second curved end portions comprise a closed loop forming a complete ring.

16. The generator of claim 10, wherein the first curved end portion of the first spring clip interfaces with a first contact portion of the first clip-shaped cavity and the second curved end portion interfaces with a second contact portion of the first clip-shaped cavity.

* * * * *